US012012756B2

(12) United States Patent
Hulsizer et al.

(10) Patent No.: US 12,012,756 B2
(45) Date of Patent: Jun. 18, 2024

(54) PRE-STRESSED INSULATED CONCRETE PANELS AND METHODS FOR MAKING AND USING THE SAME

(71) Applicants: Philip N. Hulsizer, Palacios, TX (US); Mark S. Stoutamire, Cumming, GA (US); Terrell Wiggins, Goliad, TX (US)

(72) Inventors: Philip N. Hulsizer, Palacios, TX (US); Mark S. Stoutamire, Cumming, GA (US); Terrell Wiggins, Goliad, TX (US)

( * ) Notice: Subject to any disclaimer, the term of this patent is extended or adjusted under 35 U.S.C. 154(b) by 227 days.

(21) Appl. No.: 17/723,668

(22) Filed: Apr. 19, 2022

(65) Prior Publication Data

US 2022/0356705 A1 Nov. 10, 2022

Related U.S. Application Data

(60) Provisional application No. 63/184,949, filed on May 6, 2021.

(51) Int. Cl.

| | |
|---|---|
| ***E04C 2/28*** | (2006.01) |
| ***B28B 23/04*** | (2006.01) |
| ***E04B 1/14*** | (2006.01) |
| ***E04B 1/16*** | (2006.01) |
| ***E04C 2/288*** | (2006.01) |
| ***E04C 5/08*** | (2006.01) |

(52) U.S. Cl.

CPC ............ *E04C 2/2885* (2013.01); *B28B 23/04* (2013.01); *E04B 1/14* (2013.01); *E04B 1/16* (2013.01); *E04C 5/08* (2013.01)

(58) Field of Classification Search

CPC ....... B28B 7/245; B28B 23/04; B28B 19/003; B28B 23/0056; B28B 23/0068; B28B 23/026; B28B 23/06; E04C 2/2885; E04C 5/08; E04C 2/06; E04C 2/044; E04C 2/34; E04C 2/46; E04C 2/049; E04B 1/14; E04B 1/16; E04B 1/06; E04G 21/12; E04G 11/06; E04G 2017/008

USPC .................................... 52/223.6; 249/12, 139

See application file for complete search history.

(56) References Cited

U.S. PATENT DOCUMENTS

| | | | | |
|---|---|---|---|---|
| 1,523,811 A * | 1/1925 | Lichtenberg | .............. | E04C 2/06 52/649.3 |
| 3,260,024 A | 7/1966 | Greulich | | |
| 4,999,959 A | 3/1991 | Virtanen | | |
| 8,109,691 B2 | 2/2012 | Clark | | |
| 2020/0240144 A1* | 7/2020 | Hou | ........................ | B28B 23/04 |

* cited by examiner

*Primary Examiner* — Patrick J Maestri

(74) *Attorney, Agent, or Firm* — WITHERS & KEYS, LLC

(57) ABSTRACT

Pre-stressed insulated concrete panels are disclosed. Methods of making and using pre-stressed insulated concrete panels are also disclosed.

20 Claims, 8 Drawing Sheets

PRE-STRESSED INSULATED CONCRETE PANELS AND METHODS FOR MAKING AND USING THE SAME

CROSS-REFERENCE TO RELATED APPLICATIONS

This patent application claims the benefit of priority to U.S. Provisional Patent Application Ser. No. 63/184,949 filed on May 6, 2021, and entitled "PRE-STRESSED INSULATED CONCRETE PANELS AND METHODS OF MAKING AND USING THE SAME," the subject matter of which is hereby incorporated by reference in its entirety.

FIELD OF THE INVENTION

The present invention relates generally to pre-stressed insulated concrete panels. The present invention further relates to methods of making pre-stressed insulated concrete panels and using pre-stressed insulated concrete panels such as in a building structure.

BACKGROUND OF THE INVENTION

Known methods of forming pre-stressed insulated concrete panels have one or more shortcomings including, but not limited to, forming the concrete panel in a flat configuration, namely, the thickness of the concrete panel extends perpendicularly from a ground (or forming) surface, putting an enormous amount of stress of the formed concrete panel when lifting the formed concrete panel from the flat configuration, the need for a larger work area when forming formed concrete panels in the flat configuration, etc.

There is a need for methods of making pre-stressed insulated concrete panels so as to minimize stress on the pre-stressed insulated concrete panels.

SUMMARY OF THE INVENTION

The present invention is directed to methods of making pre-stressed insulated concrete panels so as to minimize stress on the pre-stressed insulated concrete panels. In some embodiments, the methods of making pre-stressed insulated concrete panels comprise forming the pre-stressed insulated concrete panel with a concrete panel thickness of the pre-stressed insulated concrete panel extending in a horizontal orientation (i.e., the "thickness" of the pre-stressed insulated concrete panel being the thickness of the pre-stressed insulated concrete panel once erected at a building/structure site). The methods of making pre-stressed insulated concrete panels may further comprise forming the pre-stressed insulated concrete panels with a concrete panel width of the pre-stressed insulated concrete panel extending in a vertical orientation (i.e., the "width" of the pre-stressed insulated concrete panel being the width of the pre-stressed insulated concrete panel once erected at a building/structure site). The methods of making pre-stressed insulated concrete panels may even further comprise forming the pre-stressed insulated concrete panels with a concrete panel length of the pre-stressed insulated concrete panel extending in a horizontal orientation (i.e., the "length" of the pre-stressed insulated concrete panel being the height of the pre-stressed insulated concrete panel once erected at a building/structure site).

The present invention is further directed to pre-stressed insulated concrete panels formed using the herein-disclosed methods of making pre-stressed insulated concrete panels. In some embodiments of the present invention, the pre-stressed insulated concrete panels formed using the herein-disclosed methods comprises pre-stressed insulated concrete panels comprise a concrete slab having a concrete panel width, a concrete panel length, and a concrete panel thickness, the concrete panel thickness of the concrete slab being in a horizontal orientation during formation.

The pre-stressed insulated concrete panels of the present invention may further comprise (a) one or more of the following embedded panel components: (1) an insulation component, (2) (i) vertical rebar pieces, (ii) horizontal rebar pieces, or (iii) vertical rebar pieces and horizontal rebar pieces arranged in at least one layer of rebar, (3) at least one layer of fence material, (4) from about 3 to about 8 chair supports along one side surface of said concrete slab, and (5) from about 6 to about 16 pieces of pipe material, and (6) two or more sets of pre-stressed cables; (b) one or more outer surface features comprising one or more of (i) undulations and/or designs resulting from mirror undulations and/or designs along a form inner surface, (ii) one or more holes extending thru the concrete slab proximate side edges of the concrete slab, (iii) rebar pieces extending out from the outer edge surfaces of the concrete slab, (iv) one or more corner L-angle members, or (v) any combination thereof; or (c) any combination of (1) one or more embedded panel components (a) and (2) one or more outer surface features (b).

The present invention is even further directed to forms for forming pre-stressed insulated concrete panels. In some embodiments of the present invention, the forms comprise (i) an upper surface of a base form, such as in the form of a beam (e.g., an I-beam), (ii) front and back side panels extending along a concrete panel width and a concrete panel length, and (iii) first and second form end panels extending along the concrete panel width and the concrete panel thickness.

The present invention is also directed to kits, wherein the kits comprise the form for forming pre-stressed insulated concrete panels (e.g., the base form, and the vertically extending form components), and one or more of: a cable tensioner; a form vibrator; and a tensioning spacer.

The present invention is even further directed to methods of using pre-stressed insulated concrete panels. In some embodiments of the present invention, the method of using pre-stressed insulated concrete panels comprises incorporating one or more of the pre-stressed insulated concrete panels into a wall structure. Typically, a plurality of the pre-stressed insulated concrete panels is incorporated into a given wall structure. The wall structure may comprise, for example, one or more walls of a building structure, or a continuous wall structure of a building structure, the continuous wall structure extending along an outer periphery of the building structure. In some desired embodiments, the method of using pre-stressed insulated concrete panels comprises incorporating one or more of the pre-stressed insulated concrete panels into a wall structure of a building structure comprising a residential building (e.g., an apartment structure, a single-family home, etc.), a garage, a barn, a shed, a utility building, etc.

The present invention is even further directed to wall structures comprising one or more pre-stressed insulated concrete panels of the present invention. In some embodiments of the present invention, the wall structure comprises a wall structure of a building such as a residential building.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

Figure 1:
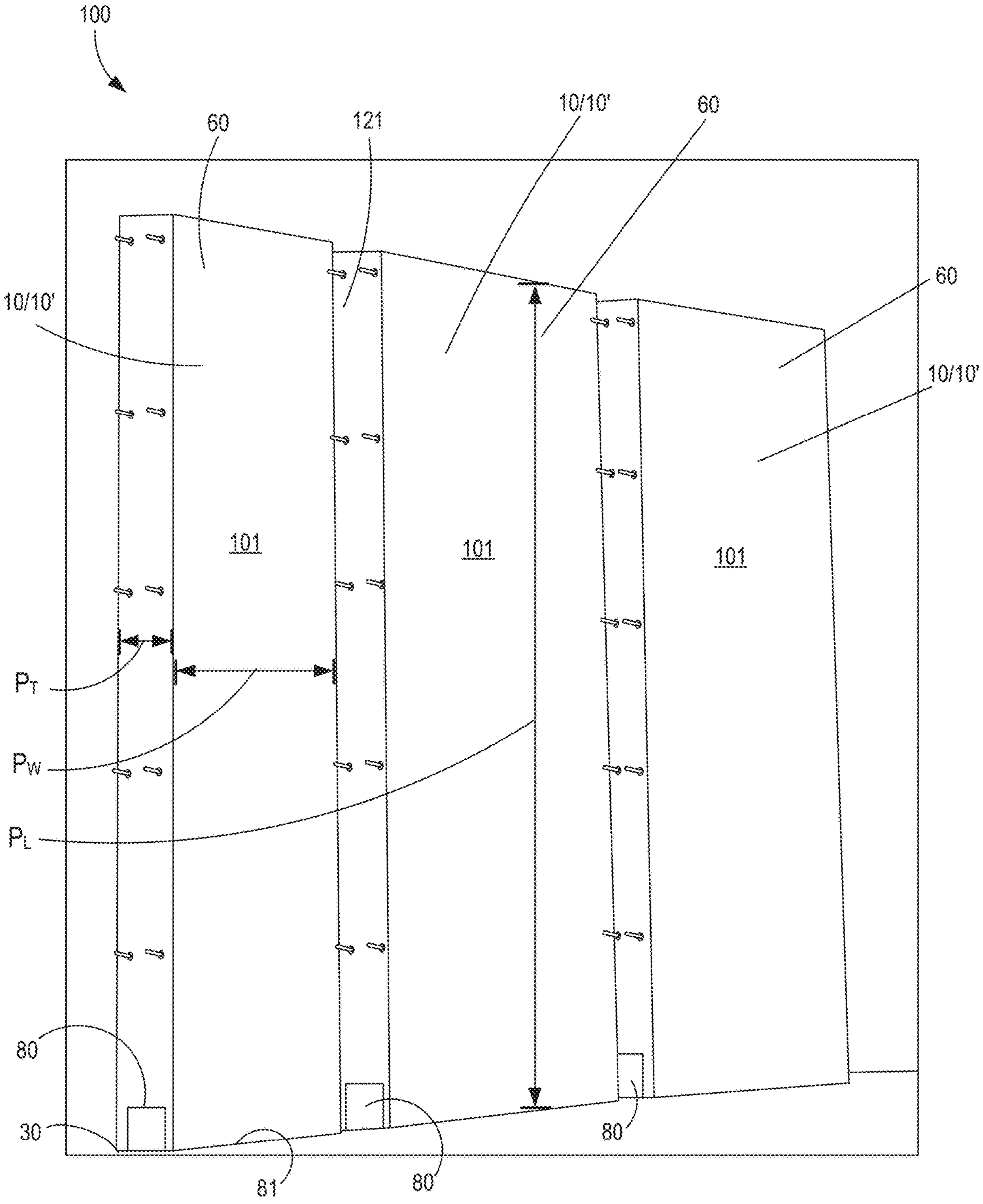
FIG. 1 depicts exemplary pre-stressed insulated concrete panels of the present invention.

The present invention is directed towards methods of making pre-stressed insulated concrete panels 10. The present invention is further directed towards pre-stressed insulated concrete panels 10 obtained using the herein-described methods of making pre-stressed insulated concrete panels 10, and methods of using the pre-stressed insulated concrete panels 10.

I. Methods of Making Pre-Stressed Insulated Concrete Panels

The present invention is directed towards methods of making pre-stressed insulated concrete panels 10. The disclosed methods of making pre-stressed insulated concrete panels 10 may (1) provide one or more of the following advantages over known methods of making concrete panels, and/or (2) comprise one or more of the following features:

- the ability to pour pre-stressed concrete panels 10 at the job site 200 using transportable concrete panel forms (e.g., forms comprising base form 20 (e.g., I-beam 20), front and back side panels 21/22, and first and second from end panels 23/24);
- pouring pre-stressed panels 10 on site 200 utilizes concrete 60 mixed locally, thereby eliminating the need to pay expensive shipping costs to transport the heavy concrete panels poured at a remote facility;
- forms are designed so that the concrete panel 10 is poured on edge with the width of the panel $P_W$ oriented vertically and the length (height) of the panel $P_L$ oriented horizontally. Since the panel 10 is taller than it is wide, the depth of concrete 60 to fill the form is reduced, as is the weight of concrete 60 that the form has to contain without bowing at the mid-span;
- the forms are designed on edge to ensure both the inside and outside faces of the concrete panel 10 are flat and finished (and optionally have an unlimited number of patterns and pattern options thereon), and the top and bottom faces are flat and finished and the sides and ends of the concrete panel 10 are square;
- the form comprises (or consists of) a base form 20 onto which are fastened form side panels 21/22, form end panels 23/24, and end structural beams 52/53 that anchor the pre-stressing cables 50. The form side panels 21/22 are fastened to the form end panels 23/24. The end structural beams 52/53 are bolted at each end of the base form 20 leaving a gap between the form end panels 23/24 and the end structural beams 52/53. The form side panels 21/22 have horizontal and vertical structural members (i.e., grid 29). The horizontal structural members extend beyond the form end panels 23/24 to contact the end structural beams 52/53 to support the compressive force of the pre-stressing cables 50 and the weight of the concrete 60 without allowing the side panels 21/22 to bow outward. Connecting straps are fastened between the side form panels 21/22 along the top edge to provide additional support to prevent the side panels 21/22 from bowing along the open top side of the form. After the concrete 60 is cured, the compressive force in the pre-stressed cables 50 is transferred to the concrete panel 10 by cutting the cables 50 in the gap between the form end panels 23/24 and end structural beams 52/53;
- the form includes features in the base form 20 and top connecting straps to locate rebar 32/33 set within the panel 10 and allow the rebar 32/33 to extend beyond the top and bottom edge 66/67 of the concrete panel 10 (e.g., thru rebar receiving holes 35 in base form 20);
- the form end panels 23/24 and end structural beams 52/53 include holes 54/55 through which the pre-stressing cables 50 are passed;
- reusable pre-stressing cable anchors 51 are installed abut to the outside face of the end support beams 52/53 to hold the tension in the cables 50 after tensioning;
- form end panels 23/24 include rare earth magnets (not shown) at the top and bottom to which steel L-angle clips 80 can be attached;
- forms include integral vibrators (not shown) to ensure concrete 60 flows to fill all the open space thus avoiding voids;
- patterns (not shown) may be incorporated onto the inside face of the forms to simulate brick, stone, wood boards, etc. to customize the exterior or both faces of the wall 100;
- multiple concrete panel forms may be included on the same base beam 20 as long as a gap is included between the form end panel 24 of one form and the form end panel 23 of the adjacent concrete panel form to allow the pre-stressing cables 50 to be cut after the concrete panels 10 cure;

after the concrete 60 is cured and the pre-stressing cables 50 are cut, the form side panels 21/22 and end panels 23/24 are unbolted and removed to strip the concrete panel 60 from the form;

after the pre-stressed concrete panel 10 is removed from the form, the form can be reassembled and the internal elements reloaded and poured again. Concrete panels 10 can be poured in batches to minimize the total number of transportable forms required to pour all the needed concrete panels 10;

the ability to move/transport a concrete panel 10, for example, by using only the internal rebar 32 of the concrete panel 10 or by clamping onto the concrete panel 10 (i.e., so as to eliminate the need for additional rigging eyes that are embedded into the face of the panel and on the top side of traditionally made, flat concrete panels). The worst loading condition for panels that are poured flat (e.g., traditional pre-stressed concrete panels) is lifting them from the flat position to a vertical position. This requires additional rigging eyes be embedded into the face of the panel and on the top side of the panel. Lifting the top edge while resting on the bottom edge puts the length of the panel under bending stress due to its own weight. The section modulus of the panel is weakest in this direction and most cracks occur when up righting the panel;

this bending problem (with traditional panels) is eliminated by lifting the panel 10 on its side. Specially designed lifting fixtures are fastened to the rebar 32 extending from the top surface 69 (side of the panel 10) of the panel 10 for stripping it from the form;

the panel 10 is then transported to a storage rack 75 to allow the panel 10 to finish curing while on its side;

after the panel 10 is fully cured, the panel 10 is lifted and placed in a rotary device (not shown) that rotates it 90° to its final upright position;

lifting fixtures (not shown) are mounted to the rebar 32 extending from both sides 66/67 of the panel 10 for transport to its final position on the foundation panel ledge 30; and the addition of lifting eyes embedded into the face and top of the panel is eliminated. This eliminates the need to fill in the concrete on the face of the panels over these embedded lifting eyes.

II. Pre-Stressed Insulated Concrete Panels

The present invention is also directed to pre-stressed insulated concrete panels 10 formed via the herein-described methods of forming pre-stressed insulated concrete panels 10. The pre-stressed insulated concrete panels 10 include, but are not limited to, the pre-stressed insulated concrete panels 10 described in the specification, the numerous embodiments, and the claims below.

The disclosed pre-stressed insulated concrete panels 10 may comprise one or more of the following features:

insulation board 31' centered between the wythes of concrete 60 that forms the inside and outside faces of the panel 10. Insulation 31 is centered between the left and right sides and top and bottom of the concrete panel 10;

solid concrete 60 on the top and bottom and right and left sides of the concrete panel 10;

rebar 32 that extends from both sides 66/67 of the panel 10 is located on either side of the insulation 31. Rebar 32 is used to lift and transport the concrete panels 10 and provide anchorage for additional rebar added in the gaps between adjacent concrete panels 10 as described herein;

pre-stressing cables 50 that extend from the top to the bottom of the concrete panel 10 and located on either side of the insulation 31;

fence material 36 that extends the width and length (height) of the concrete panel 10 is located on either side of the insulation 31;

pins 41 that extend thru the insulation 31 in a grid pattern that include a feature to anchor the inside and outside concrete wythes 82 to the insulation 31;

holes 65 along and proximate the left and right-side edges 66/67 to be used for bolting the interior and exterior pour-in-place forms (not shown)(e.g., that straddle gaps between panels 10) tightly against the inside and outside faces of the concrete panels 10;

steel L-angle clips 80 at the bottom edge corners of the panel 10 to be used to weld/anchor the concrete panels 10 to the slab 30;

pre-stressed cables 50 provide compressive stress in concrete panels 10;

pre-stressed cables 50 run from top to bottom of the concrete panel 10 to provide compressive stress to concrete panel 10 to increase bending strength and greater resistance to wind and seismic loads;

pre-stressed cables 50 are installed on either side of the insulation 31;

pre-stressed cables 50 are stressed in pairs to eliminate side load bending on the form and within the concrete panel; and form only has to resolve compressive load due to stressing the cables 50.

III. Methods of Using Pre-Stressed Insulated Concrete Panels

The present invention is also directed towards methods of using pre-stressed insulated concrete panels 10. Methods of using pre-stressed insulated concrete panels 10 include methods of using the pre-stressed insulated concrete panels 10 formed via the herein-described methods of making pre-stressed insulated concrete panels 10. The methods of using pre-stressed insulated concrete panels 10 may include, but are not limited to, methods of forming a building structure 200, a method of forming a wall structure 100, etc.

In one exemplary embodiment, the method of using the pre-stressed insulated concrete panels 10 comprises forming a building structure 200, wherein at least one wall 100 of the building structure 200 comprises a pre-stressed insulated concrete panel 10 of the present invention. Suitable building structures 200 include, but are not limited to, a residential building (e.g., an apartment structure, a single-family home, etc.), a garage, a barn, a shed, a utility building, an electrical/computer housing building, a commercial building, an industrial building, any other structure that is desired to be insulated, etc.

The present invention will be further described in the following additional embodiments, examples, and claims.

Additional Embodiments

Methods of Making Pre-Stressed Insulated Concrete Panels

1. A method of making a pre-stressed insulated concrete panel 10, said method comprising: forming the pre-stressed insulated concrete panel 10 with a concrete panel thickness $P_T$ of the pre-stressed insulated concrete panel 10 extending in a horizontal orientation (i.e., a horizontal orientation relative to a ground surface 30 or a base surface 30 or a concrete slab, etc.). As discussed above, the concrete panel thickness $P_T$ of a given pre-stressed insulated concrete panel 10 refers to the "thickness" of the pre-stressed insulated concrete panel 10 once erected at a building/structure site. See, for example, the "thickness" $P_T$ of the pre-stressed insulated concrete panel 10 shown in FIG. 1.

2. The method of embodiment 1, wherein said forming step comprises: forming the pre-stressed insulated concrete panel 10 with a concrete panel width $P_W$ of the pre-stressed insulated concrete panel 10 extending in a vertical orientation (i.e., vertical orientation relative to a ground surface 30 or a base surface 30 or a concrete slab, etc.). As discussed above, the concrete panel width $P_W$ of a given pre-stressed insulated concrete panel 10 refers to the "width" of the pre-stressed insulated concrete panel 10 once erected at a building/structure site. See, for example, the width $P_W$ of the pre-stressed insulated concrete panel 10 shown in FIG. 1.

3. The method of embodiment 1 or 2, wherein said forming step comprises: forming the pre-stressed insulated concrete panel 10 with a concrete panel length (height) $P_L$ of the pre-stressed insulated concrete panel 10 extending in the horizontal orientation (i.e., relative to a ground surface 30 or a base surface 30 or a concrete slab, etc.). As discussed above, the concrete panel length $P_L$ of a given pre-stressed insulated concrete panel 10 refers to the "height" of the pre-stressed insulated concrete panel 10 once erected at a building/structure site. See, for example, the length $P_L$ of the pre-stressed insulated concrete panel 10 shown in FIG. 1.

4. The method of any one of embodiments 1 to 3, wherein said forming step comprises: forming the pre-stressed insulated concrete panel 10 on a base form 20 (e.g., a beam 20 such as an I-beam 20). It should be understood that other base forms 20 and/or forming members/substrates having an upper surface similar to upper surface 26 of base form 20 (e.g., I-beam 20) could be used in place of base form 20 (e.g., I-beam 20).

5. The method of embodiment 4, wherein the base form 20 (e.g., I-beam 20) extends horizontally, substantially parallel with a ground surface 30.

6. The method of embodiment 4 or 5, wherein said forming step comprises: forming the pre-stressed insulated concrete panel 10 on (i) a base form 20 (e.g., I-beam 20) and between (ii) front and back side panels 21/22 extending along the concrete panel width $P_W$ and the concrete panel length (height) $P_L$, and (ii) first and second form end panels 23/24 extending along the concrete panel width $P_W$ and the concrete panel thickness $P_T$.

7. The method of embodiment 6, wherein the base form 20 (e.g., I-beam 20) comprises one or more first base form holes 25 within an upper surface 26 of the base form 20 (e.g., I-beam 20), and said forming step comprises attaching the first and second form end panels 23/24 to the upper surface 26 of the base form 20 (e.g., I-beam 20) via the one or more first base form holes 25.

Figure 2:
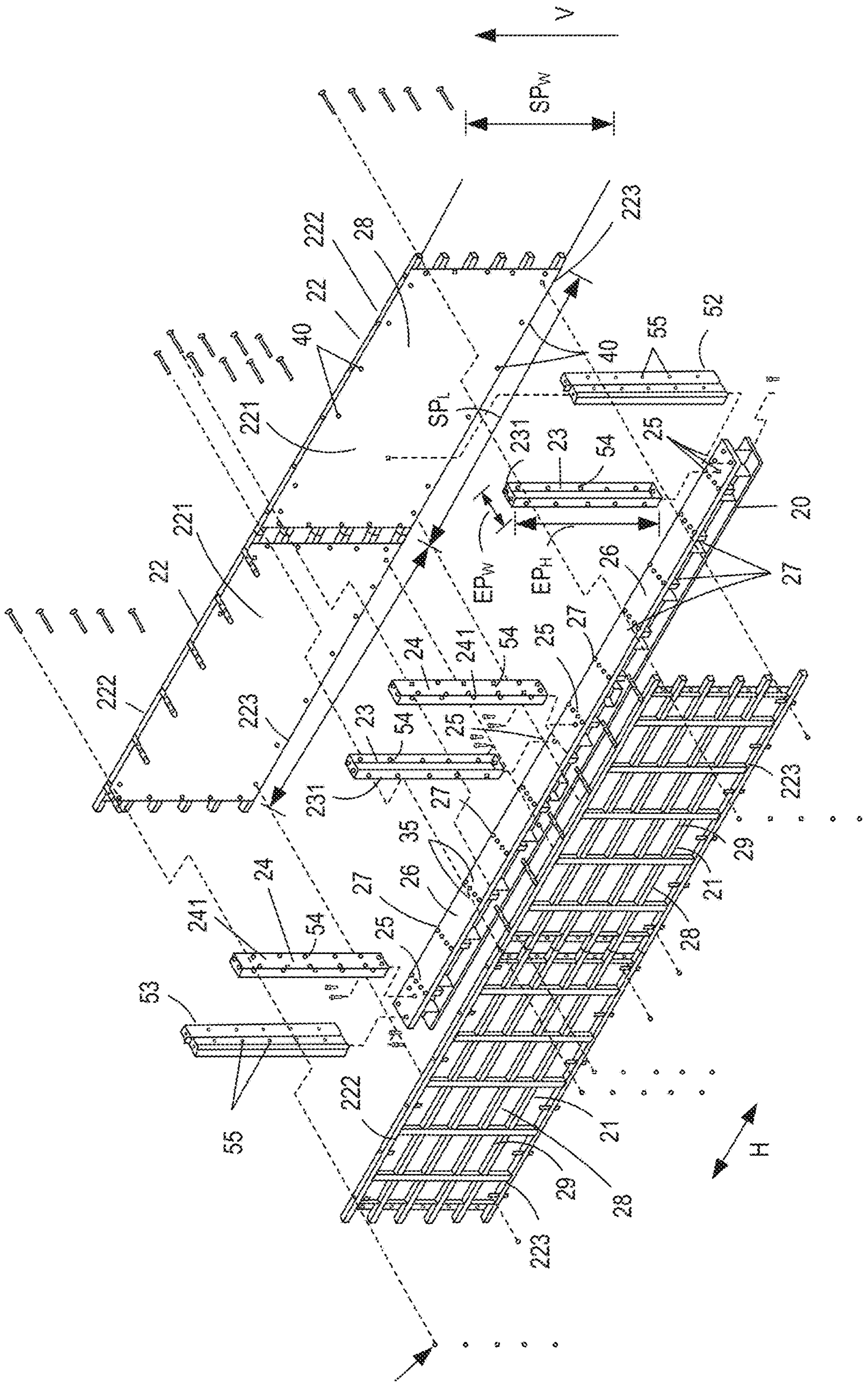
FIG. 2 depicts concrete panel form components for forming the exemplary pre-stressed insulated concrete panels shown in FIG. 1.
Figure 3A:
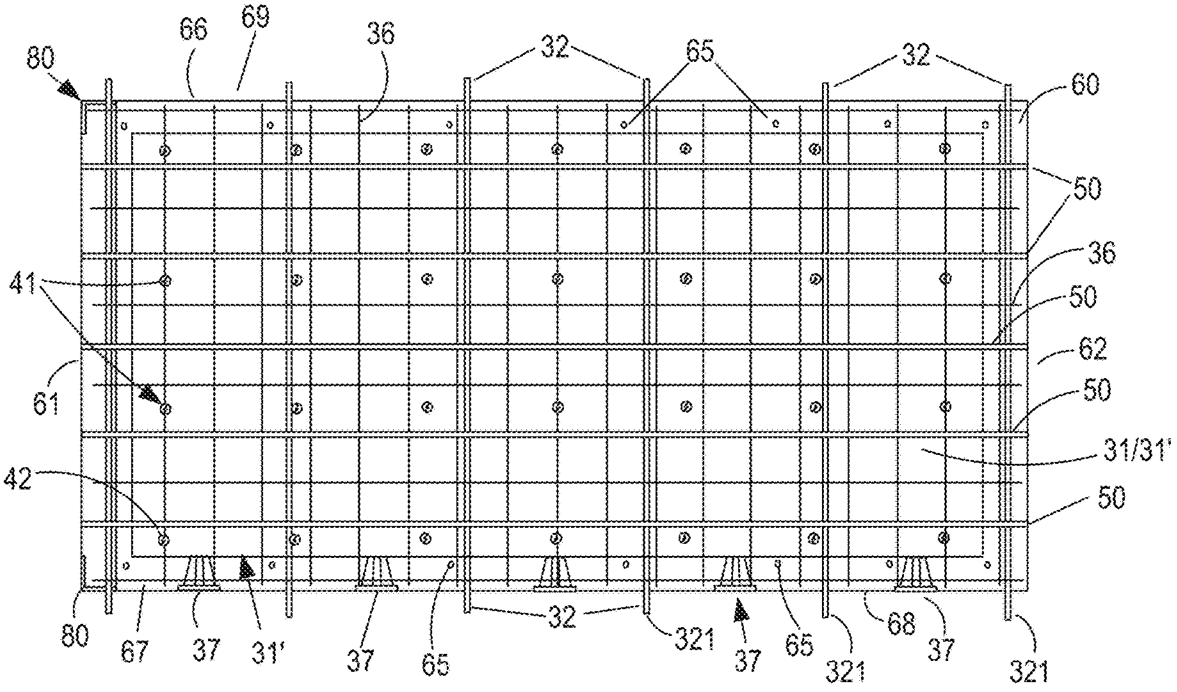
FIGS. 3A-3C depict views of exemplary panel components for embedding within the exemplary pre-stressed insulated concrete panels shown in FIG. 1 (concrete is shown translucent), namely, FIG. 3A showing a side view of the exemplary panel components, FIG. 3B showing a top view of the exemplary panel components shown in FIG. 3A, and FIG. 3C showing an end view of the exemplary panel components shown in FIG. 3A.
Figure 3B:
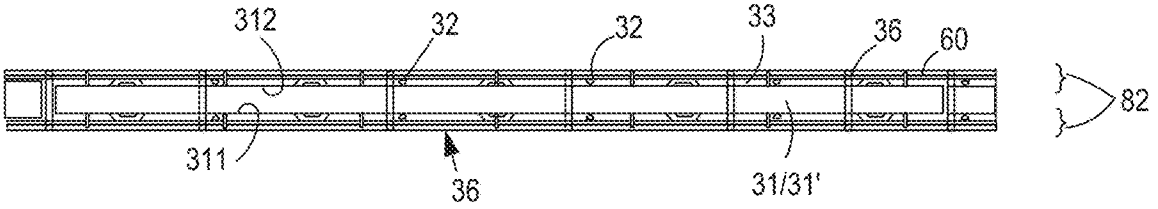
Figure 3C:
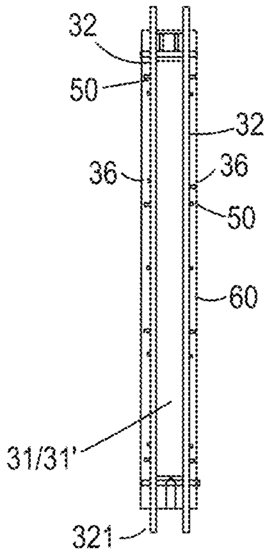
Figure 4:
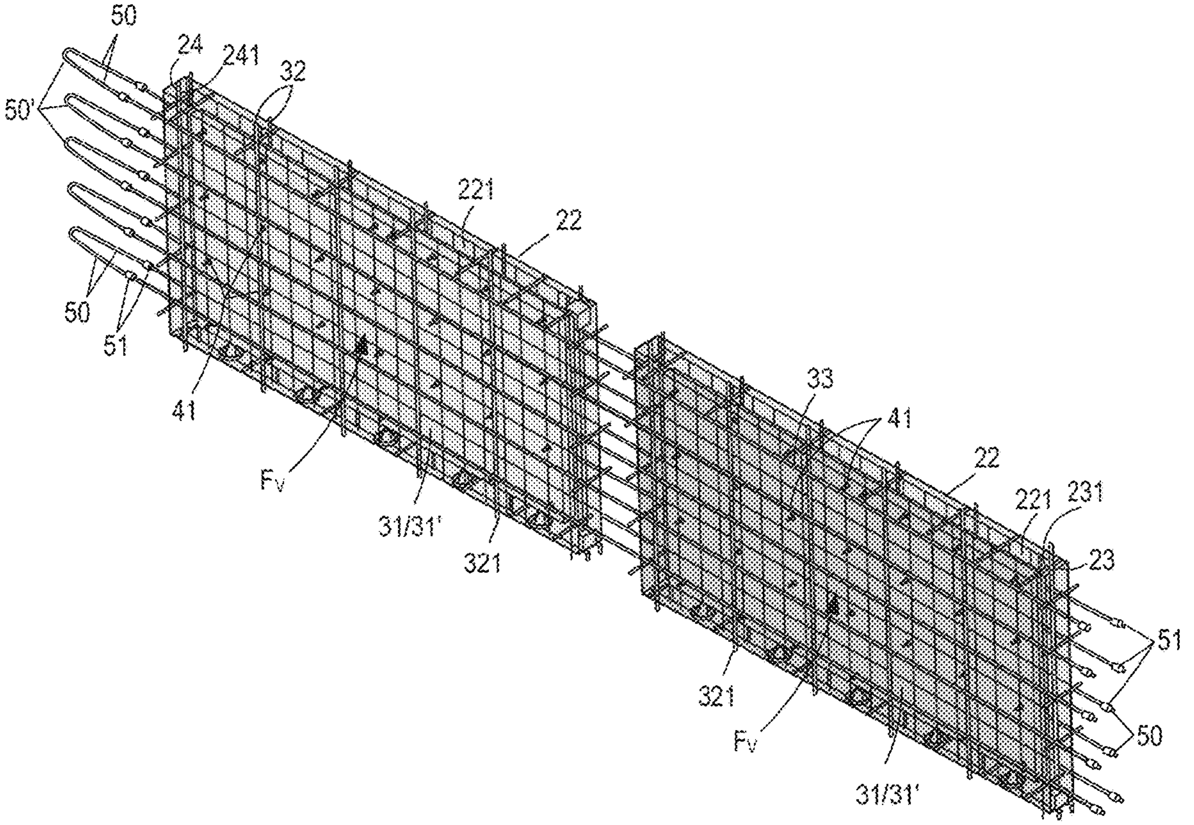
FIG. 4 depicts a frontal view of (i) the exemplary panel components shown in FIGS. 3A-3B as if positioned on an I-beam, along a rear side panel, and between opposite end panels of the exemplary concrete panel form components shown in FIG. 2, with (ii) pre-tensioned cables extending along opposite sides of the exemplary panel components and through the various exemplary concrete panel form components concrete is shown translucent)
Figure 5:
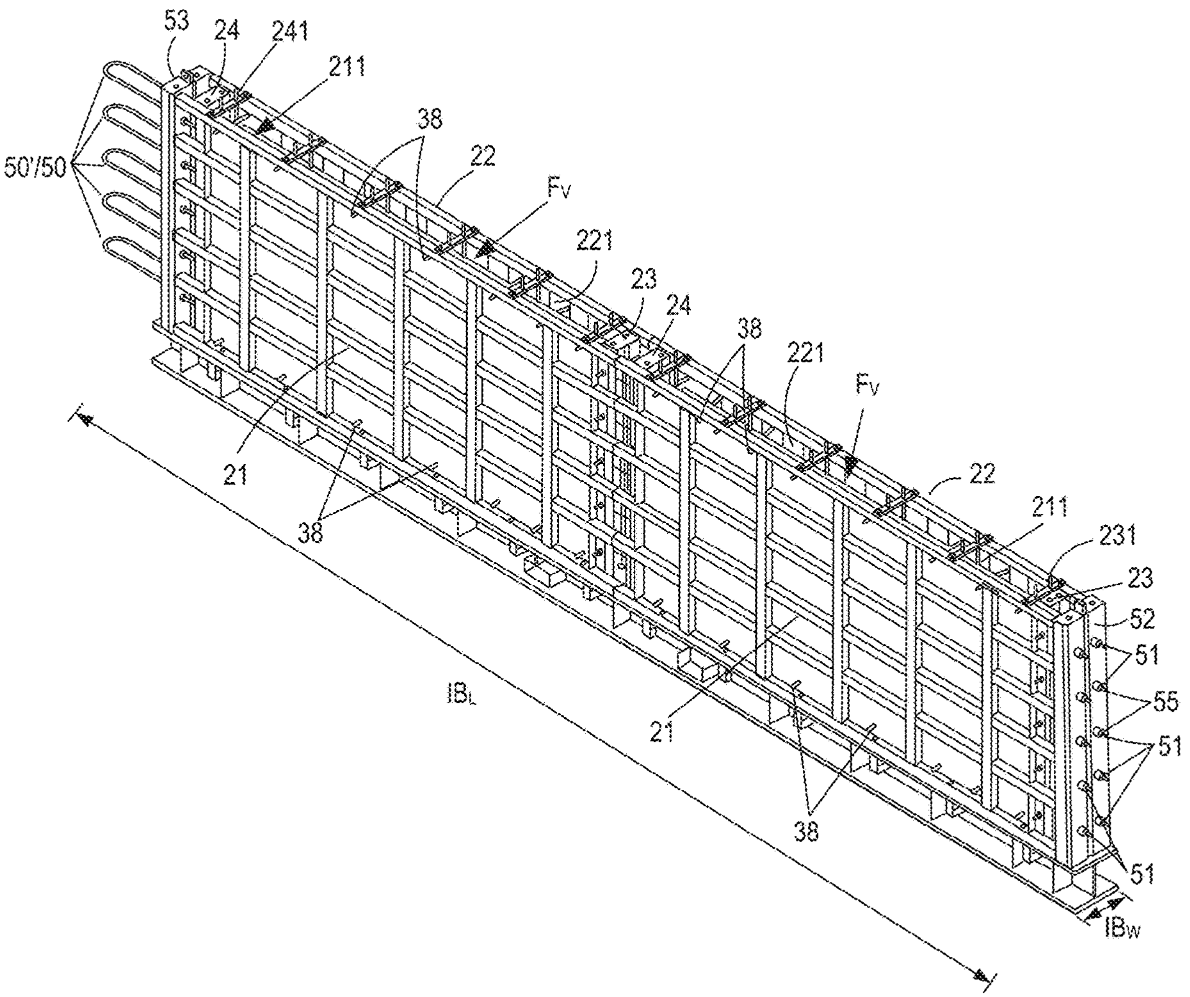
FIG. 5 depicts an exemplary assembled concrete form with all internal components shown in FIG. 4 prior to pouring concrete into the exemplary assembled concrete form.

8. The method of embodiment 6 or 7, wherein the base form 20 (e.g., I-beam 20) comprises one or more second base form holes 27 within the upper surface 26 of the base form 20 (e.g., I-beam 20), and said forming step comprises attaching the first and second side panels 21/22 to the base form 20 (e.g., I-beam 20) via the one or more second base form holes 27. See, for example, the exemplary form components shown in FIG. 2.

9. The method of any one of embodiments 6 to 8, wherein each of the front and back side panels 21/22 comprises an aluminum sheet 28. It should be understood that front and back side panels 21/22 may comprise materials other than aluminum. Suitable other materials include, but are not limited to, other metals, fiberglass, polymers, fiber-reinforced polymers, ceramics, thermosettable panels, etc.

10. The method of embodiment 9, wherein each aluminum sheet 28 is backed with a metal grid 29.

11. The method of any one of embodiments 6 to 10, wherein each of the front and back side panels 21/22 has a side panel height $SP_H$ (i.e., extending in a vertical direction) of from about 30 inches (in) to about 72 in.

12. The method of any one of embodiments 6 to 11, wherein each of the front and back side panels 21/22 has a side panel height $SP_H$ (i.e., extending in a vertical direction V) of from about 36 in to about 62 in.

13. The method of any one of embodiments 6 to 12, wherein each of the front and back side panels 21/22 has a side panel length $SP_L$ (i.e., extending in a horizontal direction H) of from about 8 ft to about 12 ft.

14. The method of any one of embodiments 6 to 13, wherein each of the front and back side panels 21/22 has a side panel length $SP_L$ (i.e., extending in a horizontal direction H) of from about 9.5 ft to about 10 ft.

15. The method of any one of embodiments 6 to 14, wherein each of the first and second form end panels 23/24 comprises an aluminum post 23/24. It should be understood that first and second form end panels 23/24 may comprise materials other than aluminum. Suitable other materials include, but are not limited to, other metals, fiberglass, polymers, fiber-reinforced polymers, ceramics, thermosettable panels, etc.

16. The method of any one of embodiments 6 to 15, wherein each of the first and second form end panels 23/24 has an end panel height $EP_H$ (i.e., extending in a vertical direction V) of from about 30 in to about 72 in.

17. The method of any one of embodiments 6 to 16, wherein each of the first and second form end panels 23/24 has an end panel height $EP_H$ (i.e., extending in a vertical direction V) of from about 36 in to about 62 in.

18. The method of any one of embodiments 6 to 17, wherein each of the first and second form end panels 23/24 has an end panel width $EP_W$ (i.e., extending in a horizontal direction H) of from about 6 in to about 16 in.

19. The method of any one of embodiments 6 to 18, wherein each of the first and second form end panels 23/24 has an end panel width $EP_W$ (i.e., extending in a horizontal direction H) of from about 6 in to about 12 in. In some embodiments, end panel width $EP_W$ is about 7.0 in.

20. The method of any one of embodiments 4 to 19, wherein the base form 20 (e.g., I-beam 20) has a base form length $IB_L$ of from about 10 feet (ft) to about 24 ft.

21. The method of any one of embodiments 4 to 20, wherein the base form 20 (e.g., I-beam 20) has a base form length $IB_L$ of about 24 ft.

22. The method of any one of embodiments 4 to 21, wherein the base form 20 (e.g., I-beam 20) has a base form width $IB_W$ of from about 10.0 in to about 24 in. In some embodiments, base form width $IB_W$ is about 12.0 in.

23. The method of any one of embodiments 6 to 22, wherein said forming step further comprises: positioning one or more embedded panel components (discussed below and shown in FIGS. 3A-5) within a form volume $F_V$ bound by (i) an upper surface 26 of the base form 20 (e.g., I-beam 20), (ii) inner surfaces 211/221 of the front and back side panels 21/22, and (iii) inner surfaces 231/241 of the first and second form end panels 23/24.

24. The method of embodiment 23, wherein the one or more embedded panel components comprise an insulation component 31.

25. The method of embodiment 24, wherein the insulation component 31 comprises an insulation board 31'.

26. The method of any one of embodiments 23 to 25, wherein the one or more embedded panel components comprise (i) vertical rebar pieces 32, (ii) horizontal rebar pieces 33, or (iii) vertical rebar pieces 32 and horizontal rebar pieces 33 arranged in at least one layer of rebar 32/33.

27. The method of embodiment 26, wherein the embedded panel components comprise vertical rebar pieces 32, and said positioning step further comprises inserting end portions 321 of the vertical rebar pieces 32 thru receiving holes 35 on an upper surface 26 of the base form 20 (e.g., I-beam 20).

28. The method of embodiment 27, wherein the one or more embedded panel components comprise horizontal rebar pieces 33, and said positioning step further comprises attaching the horizontal rebar pieces 33 to the vertical rebar pieces 32.

29. The method of any one of embodiments 26 to 28, wherein the at least one layer of rebar 32/33 comprises two layers of rebar 32/33 along opposite sides 311/312 of the insulation component 31.

30. The method of any one of embodiments 23 to 29, wherein the one or more embedded panel components comprise at least one layer of fence material 36.

31. The method of embodiment 30, wherein said positioning step further comprises attaching the at least one layer of fence material 36 to (i) the vertical rebar pieces 32, (ii) the horizontal rebar pieces 33, or (iii) the vertical rebar pieces 32 and the horizontal rebar pieces 33.

32. The method of embodiment 30 or 31, wherein at least one layer of fence material 36 comprises two layers of fence material 36/36 along opposite sides 311/312 on the insulation component 31.

33. The method of embodiment 32, wherein the insulation component 31 comprises the insulation board 31' which is sandwiched between the two layers of rebar 32/33, and the two layers of rebar 32/33 are sandwiched between the two layers of fence material 36/36.

34. The method of any one of embodiments 23 to 33, wherein the one or more embedded panel components comprise from about 3 to about 8 chair supports 37, and said positioning step further comprises positioning the chair supports 37 along an upper surface 26 of the base form 20 (e.g., I-beam 20), the chair supports 37 providing support for the insulation component 31 (e.g., insulation board 31') while concrete is being poured onto the insulation component 31.

35. The method of any one of embodiments 23 to 34, wherein the one or more embedded panel components comprise from about 6 to about 16 pieces of pipe material 38, and said positioning step further comprises positioning the pieces of pipe material 38 thru holes 40 along top and bottom edges 222/223 of the front and back side panels 21/22.

36. The method of any one of embodiments 23 to 35, wherein the one or more embedded panel components comprise a plurality of wythe tie pins 41, and said positioning step further comprises installing the plurality of wythe tie pins 41 in a grid pattern through pre-drilled holes 42 extending through the insulation board 31'.

37. The method of any one of embodiments 1 to 35, wherein said forming step further comprises: positioning a plurality of cables 50 so as to extend thru (a) a first pre-stressing cable anchor 51, a first end support beam 52, the first form end panel 23, the second form end panel 24, and out thru an opposite second end support beam 53.

38. The method of embodiment 37, wherein said positioning step further comprises looping the plurality of cables 50 back thru the opposite second end support beam 43, the second form end panel 24, the first form end panel 23, the first end support beam 52, and a second pre-stressing cable anchor 51. See, for example, FIGS. 4-5.

39. The method of embodiment 37 or 38, further comprising: applying tension on the plurality of cables 50.

40. The method of embodiment 39, wherein said applying step comprises applying tension on a loop portion 50' of each cable 50 within the plurality of cables 50, either simultaneously or sequentially. Note that this is an another, important differentiator from known methods of tensioning cables wherein the cables are tensioned individually.

41. The method of any one of embodiments 1 to 40, wherein said forming step further comprises: pouring concrete 60 into a form comprising (i) a base form 20 (e.g., I-beam 20), (ii) front and back side panels 21/22 extending along a concrete panel width $P_W$ and a concrete panel length $P_L$, and (iii) first and second form end panels 23/24 extending along the concrete panel width $P_W$ and the concrete panel thickness $P_T$.

42. The method of embodiment 41, further comprising: allowing the concrete 60 to cure.

43. The method of any one of embodiments 4 to 42, wherein said forming step comprises forming two pre-stressed insulated concrete panels 10 along the base form 20 (e.g., I-beam 20) during a single batch formation step.

44. The method of embodiment 43, wherein said forming step comprises forming each of the two pre-stressed insulated concrete panels 10 on (i) the base form 20 (e.g., I-beam 20) and between (ii) two sets of front and back side panels 21/22 extending along a concrete panel width $P_W$ and a concrete panel length $P_L$, and (ii) two sets of first and second form end panels 23/24 extending along the concrete panel width $P_W$ and the concrete panel thickness $P_T$.

45. The method of any one of embodiments 41 to 44, further comprising: separating the pre-stressed insulated concrete panel 10 from the form 20/21/22/23/24.

Figure 7:
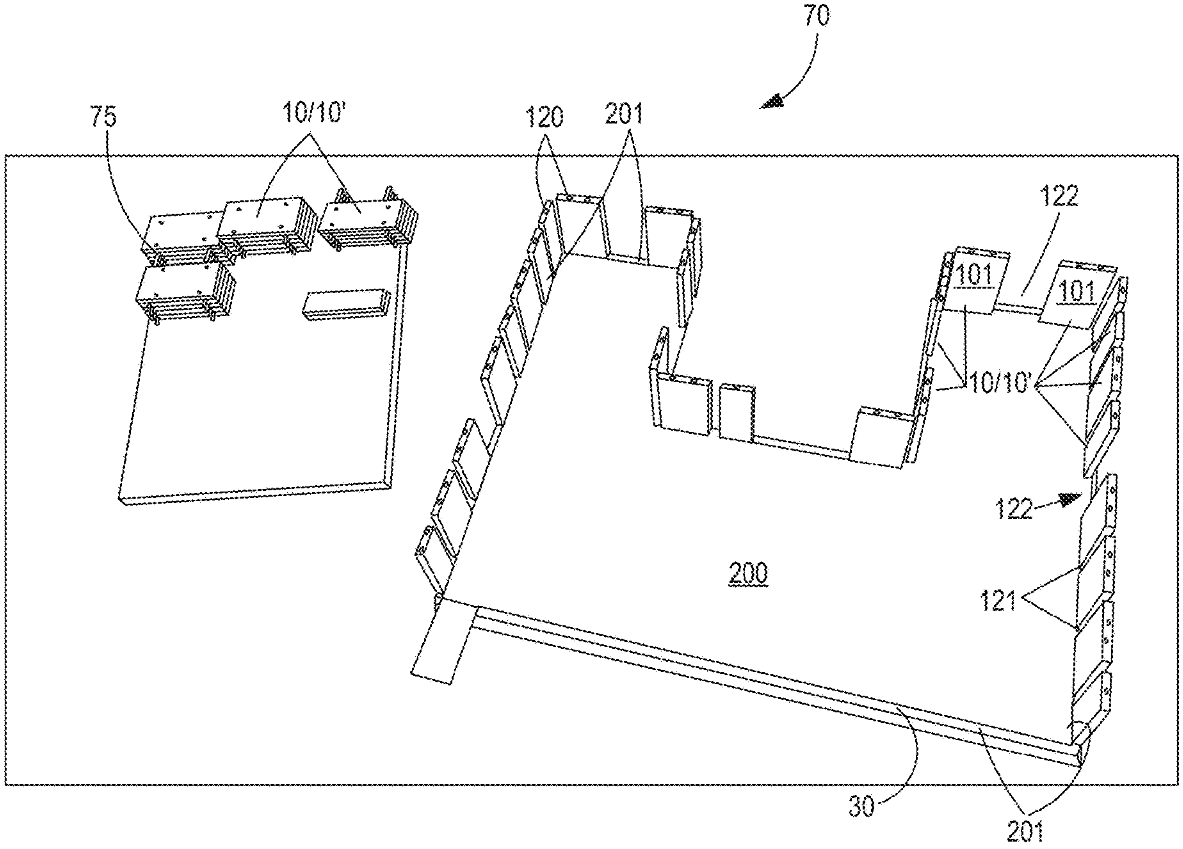
FIG. 7 depicts an aerial view of (i) numerous exemplary pre-stressed insulated concrete panels of the present invention within a staging area of a building construction site, and (ii) numerous exemplary pre-stressed insulated concrete panels of the present invention positioned along an outer boundary ledge of a concrete slab of a building structure with temporary bracing.

46. The method of any one of embodiments 4 to 45, wherein the method takes place at a job site 70 (e.g., a single-family home construction site 70). See, for example, exemplary job site 70 shown in FIG. 7.

47. A method of making a pre-stressed insulated concrete panel 10, said method comprising: forming the pre-stressed insulated concrete panel 10 at a job site 70 using transportable form components, the transportable form components comprising: a base form 20 (e.g., a beam 20 such as I-beam 20), first and second form end panels 23/24, and first and second form end panels 23/24.

48. The method of embodiment 47, wherein said forming step comprises forming the pre-stressed insulated concrete panel 10 with a concrete panel thickness $P_T$ of the pre-stressed insulated concrete panel 10 extending in a horizontal orientation (i.e., a horizontal orientation relative to a ground surface 30 or a base surface 30 or a concrete slab, etc.).

49. The method of embodiment 47 or 48, wherein said method comprises one or more features and/or steps as described in any one of embodiments 1 to 46.

Pre-Stressed Insulated Concrete Panels

50. A pre-stressed insulated concrete panel 10 formed in the method of any one of embodiments 4 to 49.

51. A pre-stressed insulated concrete panel 10 comprising: a concrete slab 10' having a concrete panel width $P_W$, a concrete panel length $P_L$, and a concrete panel thickness $P_T$, the concrete panel thickness $P_T$ of the concrete slab 10' being in a horizontal orientation during formation.

52. The pre-stressed insulated concrete panel 10 of embodiment 50 or 51, wherein the concrete panel width $P_W$ of the concrete slab 10' being in a vertical orientation during formation, and the concrete panel length $P_L$ of the concrete slab 10' being in a horizontal orientation during formation.

53. The pre-stressed insulated concrete panel 10 of any one of embodiments 50 to 52, wherein the concrete slab 10' comprises one or more embedded panel components, said one or more embedded panel components comprising one or more of: (1) an insulation component 10, (2) (i) vertical rebar pieces 32, (ii) horizontal rebar pieces 33, or (iii) vertical rebar pieces 32 and horizontal rebar pieces 33 arranged in at least one layer of rebar 32/33, (3) at least one layer of fence material 36, (4) from about 3 to about 8 chair supports 37 along one side surface 68 of said concrete slab 10', and (5) from about 6 to about 16 pieces of pipe material 38. It should be noted that in some embodiments, chair supports 37 are permanently embedded within the concrete slab 10'. In other embodiments, chair supports 37 are removable from the concrete slab 10'.

54. The pre-stressed insulated concrete panel 10 of embodiment 50 or 53, wherein the one or more embedded panel components comprise an insulation component 31.

55. The pre-stressed insulated concrete panel 10 of embodiment 54, wherein the insulation component 31 comprises an insulation board 31'.

56. The pre-stressed insulated concrete panel 10 of any one of embodiments 50 and 53 to 55, wherein the one or more embedded panel components comprise at least one layer of rebar 32/33.

57. The pre-stressed insulated concrete panel 10 of embodiment 56, wherein the at least one layer of rebar 32/33 comprises two layers of rebar 32/33 along opposite sides 311/312 on the insulation component 31.

58. The pre-stressed insulated concrete panel 10 of any one of embodiments 50 and 53 to 57, wherein the one or more embedded panel components comprise at least one layer of fence material 36.

59. The pre-stressed insulated concrete panel of embodiment 58, wherein the at least one layer of fence material 36 comprises two layers of fence material 36/36 along opposite sides 311/312 of the insulation component 31.

60. The pre-stressed insulated concrete panel 10 of any one of embodiments 50 and 53 to 59, wherein the one or more embedded panel components comprise (1) an insulation board 31', (2) vertical rebar pieces 32 and horizontal rebar pieces 33 arranged in at least one layer of rebar 32/33, and (3) at least one layer of fence material 36, wherein the insulation board 31' is sandwiched between two layers of rebar 32/33, and the two layers of rebar 32/33 are sandwiched between two layers of fence material 36/36.

61. The pre-stressed insulated concrete panel 10 of any one of embodiments 50 and 53 to 60, wherein the one or more embedded panel components comprise from about 3 to about 8 chair supports 37, and the chair supports 37 are along an outer side edge surface 68 of the concrete slab 10'.

62. The pre-stressed insulated concrete panel 10 of any one of embodiments 50 and 53 to 61, wherein the one or more embedded panel components comprise from about 6 to about 16 pieces of pipe material 38, and the pieces of pipe material 38 form holes 65 extending along outer side edges 66/67 of the concrete slab 10'.

63. The pre-stressed insulated concrete panel 10 of any one of embodiments 50 and 53 to 62, wherein the one or more embedded panel components comprise a plurality of wythe tie pins 41, the plurality of wythe tie pins 41 being in a grid pattern through pre-drilled holes 42 extending through the insulation board 31'.

64. The pre-stressed insulated concrete panel 10 of any one of embodiments 50 to 63, wherein the concrete slab 10' comprises one or more surface features on one or more outer surfaces 108/109 thereof, said surface features comprising one or more of (i) undulations and/or designs (not shown) resulting from mirror undulations and/or designs along a form inner surface (e.g., upper surface 26 of base form 20 (e.g., I-beam 20), or inner surface 221 of back side panel 22), (ii) one or more holes 65 extending thru the concrete slab 10' proximate side edges 66/67 of the concrete slab 10', (iii) rebar pieces 32 extending out from outer side surfaces 68/69 of the concrete slab 10', (iv) one or more corner L-angle members 80, or (v) any combination thereof. As discussed above, the surface features may include a pattern or patterns on one or more of outer surfaces 108/109. Any pattern and/or patterns may be used.

65. The pre-stressed insulated concrete panel 10 of any one of embodiments 50 to 64, wherein the concrete slab 10' comprises one or more surface features comprising undulations and/or designs (not shown) resulting from mirror undulations and/or designs along a form inner surface (e.g., upper surface 26 of base form 20 (e.g., I-beam 20), or inner surface 221 of back side panel 22).

66. The pre-stressed insulated concrete panel 10 of any one of embodiments 50 to 65, wherein the concrete slab 10' comprises one or more surface features comprising one or more holes 65 extending thru the concrete slab 10' proximate side edges 66/67 of the concrete slab 10'.

67. The pre-stressed insulated concrete panel 10 of any one of embodiments 50 to 66, wherein the concrete slab comprises one or more surface features comprising rebar pieces 32 extending out from outer side surfaces 68/69 of the concrete slab 10'.

68. The pre-stressed insulated concrete panel 10 of any one of embodiments 50 to 67, wherein the concrete slab 10' comprises one or more surface features comprising two corner L-angle members 80 in corners along a bottom edge 81 of the concrete slab 10'.

69. The pre-stressed insulated concrete panel 10 of any one of embodiments 64 to 67, wherein the form comprises (i) an upper surface 26 of a base form 20 (e.g., I-beam 20), (ii) front and back side panels 21/22 extending along the concrete panel width $P_W$ and the concrete panel length (height) $P_L$, and (iii) first and second form end panels 23/24 extending along the concrete panel width $P_W$ and the concrete panel thickness $P_T$.

70. The pre-stressed insulated concrete panel 10 of any one of embodiments 50 to 69, wherein the concrete panel width $P_W$ ranges from about 24 in to about 72 in, the concrete panel length $P_L$ ranges from about 72 in to about 130 in, and the concrete panel thickness $P_T$ ranges from about 5.0 in to about 14.0 in.

71. The pre-stressed insulated concrete panel 10 of any one of embodiments 50 to 70, wherein the concrete panel width $P_W$ ranges from about 30 in to about 60 in, the concrete panel length (height) $P_L$ ranges from about 110 in to about 120 in, and the concrete panel thickness $P_T$ ranges from about 6.0 in to about 12.0 in.

72. The pre-stressed insulated concrete panel 10 of any one of embodiments 50 to 71, wherein (a) the concrete panel width $P_W$ is about 36 in, the concrete panel length (height) $P_L$ is about 116 in, and the concrete panel thickness $P_T$ is about 7.0 in, or (b) the concrete panel width $P_W$ is about 60 in, the concrete panel length (height) $P_L$ is about 116 in, and the concrete panel thickness $P_T$ is about 7.0 in.

Figure 6:
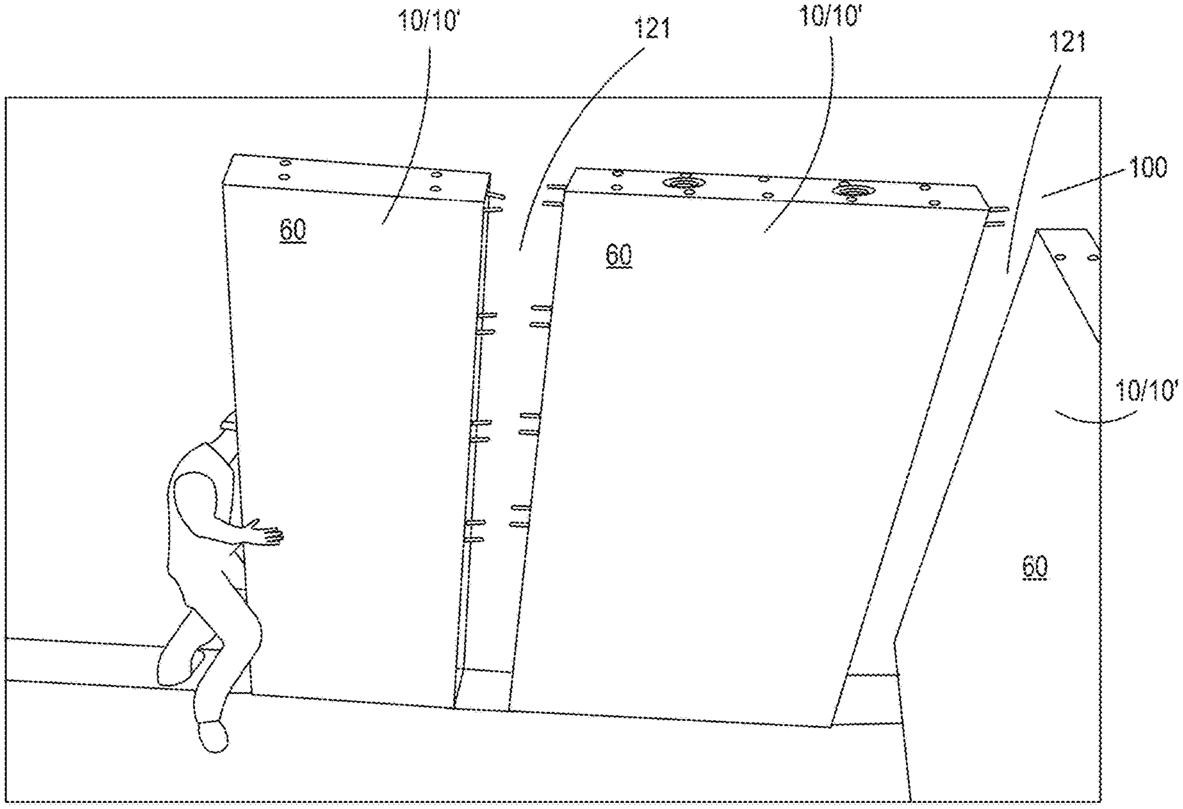
FIG. 6 depicts exemplary pre-stressed insulated concrete panels of the present invention positioned along an outer boundary ledge of a concrete slab of a building structure with temporary bracing.

73. The pre-stressed insulated concrete panel 10 of any one of embodiments 50 to 72, wherein the pre-stressed insulated concrete panel 10 does not have any panel lifting eyes installed on or within either of major surfaces 108/109 of the pre-stressed insulated concrete panel 10. See, FIG. 6.

Forms for Forming Using Pre-Stressed Insulated Concrete Panels

74. A form for use in the method of any one of embodiments 1 to 49 or for forming the pre-stressed insulated concrete panel 10 of any one of embodiments 50 to 73, wherein the form comprises (i) an upper surface 26 of an base form 20 (e.g., I-beam 20), (ii) front and back side panels 21/22 extending along the concrete panel width $P_W$ and the concrete panel length (height) $P_L$, and (iii) first and second form end panels 23/24 extending along the concrete panel width $P_W$ and the concrete panel thickness $P_T$.

Kits for Forming Using Pre-Stressed Insulated Concrete Panels

75. A kit comprising the form of embodiment 74, said kit further comprising one or more of: a cable tensioner (not shown); a form vibrator (not shown); a tensioning spacer; (not shown), a lifting device (not shown), a rotating device (not shown), and a storage rack 75.

Methods of Using Pre-Stressed Insulated Concrete Panels

76. A method of using the pre-stressed insulated concrete panel 10 of any one of embodiments 50 to 73, said method comprising: incorporating one or more of the pre-stressed insulated concrete panels 10 into a wall structure 100.

77. The method of embodiment 76, wherein said incorporating step comprises: incorporating a plurality of the pre-stressed insulated concrete panels 10 into the wall structure 100.

78. The method of embodiment 76 or 77, wherein the wall structure 100 comprises one or more walls 101 of a building structure 200.

79. The method of any one of embodiments 76 to 78, wherein the wall structure 100 comprises a continuous wall structure 120 of a building structure 200, the continuous wall structure 120 extending along an outer periphery 201 of the building structure 200.

80. The method of embodiment 78 or 79, wherein the building structure 200 comprises a residential building 200 (e.g., an apartment structure, a single-family home, etc.), a garage, a barn, a shed, a utility building, an electrical/computer housing building, a commercial building, an industrial building, any other structure that is desired to be insulated, etc.

81. The method of any one of embodiments 78 to 80, further comprising: spacing the one or more pre-stressed insulated concrete panels 10 apart from one another along a base surface 30 of the building structure 200.

82. The method of embodiment 81, wherein the one or more pre-stressed insulated concrete panels 10 are spaced apart (i) by about 1.0 ft to 1.5 ft along wall portions 121 that do not contain a window (not shown) or door (not shown), or (ii) by about 2.0 ft to about 10.0 along wall portions 122 that do contain a window (not shown) or door (not shown).

83. The method of embodiment 81 or 82, wherein the one or more pre-stressed insulated concrete panels 10 are spaced apart (i) by about 1.0 ft along wall portions 121 that do not contain a window or door, or (ii) by about 3.0 ft to about 6.0 along wall portions 122 that do contain a window or door.

84. The method of any one of embodiments 81 to 83, further comprising: positioning one or more wall embedded components (not shown) between the spaced apart pre-stressed insulated concrete panels 10, the one or more wall embedded components comprising electrical wiring (not shown), electrical outlets (not shown), wall insulation component (not shown), wall rebar (not shown), plumbing (not shown), chases (not shown), fiber-optic cable (not shown), heating and cooling components (not shown), or any combination thereof.

85. The method of any one of embodiments 81 to 84, further comprising: attaching pour-in-place forms (not shown) to the spaced apart pre-stressed insulated concrete panels 10.

86. The method of embodiment 85, wherein said attaching step comprises attaching the pour-in-place forms to the spaced apart pre-stressed insulated concrete panels 10 via holes 65 along outer edges 66/67 of the pre-stressed insulated concrete panels 10.

87. The method of embodiment 85 or 86, further comprising: pouring concrete 60 in gaps 121 between the spaced apart pre-stressed insulated concrete panels 10 and the pour-in-place forms (not shown) to form the continuous wall structure 120.

88. The method of any one of embodiments 85 to 87, further comprising: removing the pour-in-place forms (not shown) from the wall structure 100.

89. The method of embodiment 78 or 88, further comprising: assembling a roof (not shown) onto the one or more walls 101 of the building structure 200.

Wall Structures Comprising Pre-Stressed Insulated Concrete Panels

90. A wall structure 100 comprising the pre-stressed insulated concrete panel 10 of any one of embodiments 50 to 73.

91. A wall structure 100 comprising a plurality of pre-stressed insulated concrete panels 10, wherein each of the pre-stressed insulated concrete panels 10 comprises the pre-stressed insulated concrete panel 10 of any one of embodiments 50 to 73.

92. A wall structure 100 comprising (i) a plurality of spaced apart pre-stressed insulated concrete panels 10, wherein each of the pre-stressed insulated concrete panels 10 comprises the pre-stressed insulated concrete panel 10 of any one of embodiments 50 to 73, and (ii) pour-in-place concrete columns (not shown) between the spaced apart pre-stressed insulated concrete panels 10.

93. A wall structure 100 comprising (i) a plurality of spaced apart pre-stressed insulated concrete panels 10, wherein each of the pre-stressed insulated concrete panels 10 comprises the pre-stressed insulated concrete panel 10 of any one of embodiments 50 to 73, (ii) pour-in-place concrete columns (not shown) between some of the spaced apart pre-stressed insulated concrete panels 10, and (iii) pour-in-place headers and/or footers (not shown) between some of the spaced apart pre-stressed insulated concrete panels 10.

Building Structures Comprising Pre-Stressed Insulated Concrete Panels

94. A building 200 comprising the wall structure 100 of any one of embodiments 90 to 93.

95. The building 200 of embodiment 94, wherein the building 200 is a residential building 200 (i.e., a building occupied by people). As discussed above, the residential building 200 could be any building 200 in which people reside such as an apartment structure, a single-family home, etc.

96. The building 200 of embodiment 94 or 95, wherein the building 200 is a single-family home 200.

97. The building 200 of embodiment 94, wherein the building 200 is a garage, a barn, a shed, a utility building, an electrical/computer housing building, a commercial building, an industrial building, or any other type of building in which people and/or animals use (but not necessarily reside in).

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples provide techniques for forming pre-stressed insulated concrete panels 10, and using the pre-stressed insulated concrete panels 10 to form a building structure 200.

Example 1—Forming Pre-Stressed Insulated Concrete Panels

The following steps were used to from pre-stressed insulated concrete panels 10 at a home construction site 200:

1. Concrete panel forms, namely, (i) a base form 20 (e.g., I-beam 20), (i) opposite front and back side panels (i.e., back and front side panels 21/22), and (iii) opposite first and second form end panels 23/24, were assembled except for the front form side panel 21 (i.e., in a manner similar to the exemplary form and exemplary panel components set-up shown in FIG. 4);

2. Internal panel wall structural components were installed within the form from the back side panel 22 to the front side panel 21, with the internal panel wall structural components comprising (i) a first set of pre-tensioned ⅜ in cables 50, (ii) a first layer of fence material 36, (iii) a first layer of ½ in rebar 32/33, (iv) a 3 in thick rigid insulation board 31', (v) a second grid of ½ in rebar 32/33, (vi) a second layer of fence material 36, and (vii) a second set of pre-tensioned ⅜ in cables 50;

3. In step (2) above, release cones (not shown) were installed onto the end portions 321 of all vertical rebar pieces 32 that penetrated the bottom base form 20 (e.g., I-beam 20);

4. In step (2) above, each layer of rebar 32/33 was installed so that (a) end portions 321 of the vertical rebar pieces 32 extended into (i) holes 35 within the base form 20 and (ii) holes in connecting straps, and (b) horizontal rebar pieces 33 were positioned and secured onto the vertical rebar pieces 32 (e.g., via wire (not shown))(Note, a horizontal piece of steel flat bar with predrilled holes therein (not shown) may be placed on top of front side panel 21 and connect with a top of back side panel 22. The horizontal piece of steel flat bar can slide down over the vertical rebar pieces 32 (i.e., the rebar ends opposite end portions 321 of the vertical rebar pieces 32) so that the vertical rebar pieces 32 extend through the predrilled holes of the horizontal piece of steel flat bar. When fastened to front side panel 21 and back side panel 22, the horizontal piece of steel flat bar holds the captured rebar ends 32 (i.e., the rebar ends opposite end portions 321 of the vertical rebar pieces 32) in the correct position.);

5. In step (2) above, each fence 36 was wired to adjacent rebar layers 32/33 so as to center the fence 36, left/right and top/bottom, within the form;

6. In step (2) above, temporary insulation support chairs 37 were installed to support the insulation board 31'; the insulation board 31' was positioned on rebar chairs 37 and centered left/right within the form; and the insulation board 31' was inserted onto the horizontal rebar pieces 33 using predrilled holes 42 in the insulation board 31' to secure the insulation board 31' in the proper location;

7. In step (2) above, wythe tie pins 41 were installed in a grid pattern through pre-drilled holes 42 extending through the insulation board 31';

8. The pre-tensioned ⅜ in cables 50 were installed thru (a) a pre-stressing cable anchor 51, a first end support beam 52, a first form end panel 23, a second form end panel 24, and out thru an opposite second end support beam 53 along the back panel 23, prior to installing the fence material 36, the insulation 31, and the rebar 32/33, and (b) then looped back thru the opposite second end support beam 53, the second form end panel 24, the first form end panel 23, the first end support beam 52, and another pre-stressing cable anchor 51, after installing the fence material 36, the insulation 31, and the rebar 32/33;

9. The pre-stressing cable anchors 51 were fixed onto the free end abut to the first end support beam 52;

10. A spacer (not shown) was positioned between the loop 50' of the pre-stressing cable 50 and the second end support beam 53;

11. The pre-stressing cables 50 were pulled "hand-tight" against the spacer so as to set the pre-stressing cable anchors 51 on both ends;

12. L-angle embeds 80 were attached to magnets (not shown) at top and bottom corners of the second form end panel 24 (i.e., the corners representing the lower corners of the finished pre-stressed insulated concrete panel 10);

13. Plastic tubes 38 were inserted thru holes 40 along and proximate top and bottom edges 222/223 of the form front and back side panels 21/22 so as to protrude from front and back form side panels 21/22 (i.e., to form the holes 65 in the finished pre-stressed insulated concrete panel 10 used for mounting pour-in-place forms thereto);

14. A hydraulic tensioning cylinder (not shown) was installed so that the base was against the pre-stressing cable anchors 51 (i.e., along second support beam 53) and the cylinder rod was nested within the loop 50' of the pre-stressing cable 50 (Note that the tension cable 50 is typically routed so that each row or layer of tension cables 50 is actually one cable 50. For example, the cable 50 could be installed starting on the right end of the form and could be inserted through the appropriate holes to the left end of the form where it would make a loop 50' and then be inserted back into the left end of the form. Two cable anchors 51 would be installed in the correct orientation and then the cable 50 would be inserted through the appropriate holes back to the right side of the form. Cable anchors 51 would be installed on the ends of the tension cables 50 on the right side of the form. A tensioning device (not shown) would be installed between the loop 50' in the cable 50 and the two cable anchors 51 on the left end of the form. As pressure is applied to the tension device it is positioned inside the loop 50' of the tension cable 50 and pushes against the cable anchors 51 on the left end of the form. The cable anchors 51 on the right end of the form prevent the cable 50 from moving while pressure is applied on the other end of the cable 50 with the tensioning device. As the looped end of the cable 50' is put under tension it stretches the two lengths of tension cable 50 in the form in unison. Once the correct tension is achieved the cable anchors 51 on the left end of the form (behind the tension device) holds the tensioned cable 50 under tension while the tension on the tension devise is released.);

15. The cylinder was pressurized to the recommended pressure to achieve the desired pre-stressing cable tension;

16. The hydraulic tensioning cylinder was depressurized and moved to the next pre-stressing cable loop 50';

17. Steps (14) to (16) were repeated to tension all pre-stressing cables 50;

18. Concrete 60 was poured into the form;

19. Vibrators (not shown) were energized to ensure concrete 60 flowed to fill entire form without leaving and voids;

20. Concrete 60 was allowed to cure (i.e., set) to a predetermined hardness prior to form disassembly;

21. After initial concrete 60 cure time had passed, pre-tension cables 50 were cut in the gaps between the form end panels 24/23 and the end structural beams 52/53 (i.e., along the bottom edge 61 and top edge 62 of the formed pre-stressed insulated concrete panel 10);

22. The plastic tubes 38 were removed from along top and bottom edges 222/223 of the form front and back side panels 21/22;

23. Remove top connecting straps;

24. A specially designed lifting fixture (not shown) was installed to the rebar 33 at both ends of the side 66 of the formed pre-stressed insulated concrete panel 10;

25. The lifting fixtures were connected to the boom of yard fork truck;

26. The front form side panel 21 was unbolted and removed;

27. The first and second form end panels 23/24 were unbolted and removed;

28. The formed pre-stressed insulated concrete panel 10 was lifted to (i) remove from the form, and (ii) transport to a curing rack 75;

29. The lifting fixture was removed from the formed pre-stressed insulated concrete panel 10; and 30. The formed pre-stressed insulated concrete panel 10 was allowed to fully cure prior to installation.

Example 2—Method for Forming a Building Using Pre-Stressed Insulated Concrete Panels The following method was used to form a building construction using a combination of (1) pre-stressed insulated concrete panels, such as the pre-stressed insulated concrete panels formed in Example 1, and (2) poured-in-place panels to form a continuous structural perimeter around an edge of a poured concrete floor and foundation. Although additional steps may be used, the steps used in the present examples were:

1. Pre-stressed insulated concrete panels were erected on a panel ledge on a perimeter of a previously poured concrete slab;
2. Pre-stressed insulated concrete panels were erected leaving a 1.0 foot (ft) gap between adjacent wall panels and supported by temporary bracing;
3. Pre-stressed insulated concrete panels were separated from one another with larger/wider gaps at locations intended for doors, sliding glass doors, or windows and supported by temporary bracing;
4. Pre-stressed insulated concrete panels included horizontal rebar that extended on either side of the pre-stressed panel;
5. Additional rebar was fastened to (i) the rebar extending from the sides of the pre-stressed insulated concrete panels in the 1.0 ft gaps between the wall panels, (ii) below and above the elevation of the window in the window gaps, and (iii) above the door and sliding glass door gaps;
6. Temporary pour-in-place forms were assembled (i) on the inside and outside of the 1.0 ft wall gaps, (ii) below & above the window gaps, and (iii) above the door and sliding glass door gaps;
7. The pour-in-place forms have features to mount electrical boxes for outlets and switches and conduit chases that extend to a top of a given gap, conduit chases consisting of rectangular boxes were installed in the given gap to provide a pathway for electrical wires for outlets and switches and provide dead air space insulation within the concrete of the gap;
8. Concrete was poured into (i) the forms in the 1.0 ft wall gaps, (ii) the forms below and above the window elevation in the window gaps, and (iii) the header forms above the door and sliding glass door gaps;
9. After the concrete in the gaps was cured, the forms and temporary bracing were removed and the continuous concrete perimeter wall remained; and
10. A steel roof was attached to the continuous concrete perimeter wall so as to provide a building wherein the concrete wall structure, the concrete slab, and the steel roof provided a building structure constructed from non-combustible and termite proof materials.

Example 3—Method for Forming a Building Using Pre-Stressed Insulated Concrete Panels The following method was also used to form a building construction using a combination of (1) pre-stressed insulated concrete panels, such as the pre-stressed insulated concrete panels formed in Example 1, and (2) poured-in-place panels to form a continuous structural perimeter around an edge of a poured concrete floor and foundation. Although additional steps may be used, the steps used in the present examples were:

1. Prepare the site;
2. Clear the land and grade;
3. Dig and form footer for garage and house slabs with panel ledge around perimeter and rough in the utilities;
4. Pour concrete footer and slab for garage and house;
5. Allow concrete footers and slabs to cure;
6. Layout panel location on panel ledge around perimeter;
7. Transport panel forms to site and stage on site slabs;
8. Stage concrete panel curing rack on site;
9. Form pre-stressed insulated concrete panels using the method as described in Example 1;
10. After first batch of concrete panels are cured, re-attach lifting fixture or attach clamping device;
11. Rig lifting fixtures from both sides of the top of the panel to the boom on the yard fork truck, lift the panel with the boom of the fork truck as the rotary device turns the panel in the upright position thus transferring the load to the fork truck;
12. Transport the panel to its final position on the foundation panel ledge;
13. Level and plumb the panel and attach temporary bracing to the rebar extending from either side of the panel (Note that an extra tube may be added on each side at a distance from the edge that will be beyond the extent the pour-in-place forms overlap the edge and at an elevation suited to attach the temporary rigging. A shoulder eyebolt could be inserted thru the hole in the concrete and secured with a nut on the backside to which the temporary bracing is fastened.);

14. Anchor the panel to the foundation panel ledge;
15. Remove all rigging from the panel;
16. Repeat steps 10 to 15 for remaining panels;
17. After concrete panels are set and secured with temporary bracing, drill required holes into the panel ledge to epoxy vertical rebar pieces, as needed, in all pour-in-place 1.0 ft gaps;
18. Fasten horizontal rebar pieces (i.e., on the exterior side of the panels) to the horizontal rebar extending from the sides of the concrete panels into the gaps in the walls and the bottom and top of the window gaps, and the top of the door and sliding glass door gaps;
19. Install the electrical chase/insulation between the rebar in the 1.0 ft gaps between wall panels;
20. Fasten horizontal rebar pieces (i.e., on the interior side of the panels) to the horizontal rebar extending from the sides of the concrete panels into the 1.0 ft gaps in the walls;
21. Install and epoxy in place all required vertical rebars in the poured-in-place gaps;
22. Wire tie the vertical rebar pieces to the horizontal rebar pieces on the interior and exterior of the poured-in-place gaps;
23. Position electrical boxes and fasten to the gaps inside form, as applicable;
24. Set and secure in place the inside and outside gap forms for the 1.0 ft gaps and fasten to the wall by running bolts through the holes left by the tubes along the sides of the concrete panels formed in Example 1;
25. Install the header form above the windows, doors, and sliding glass door gaps;
26. Install temporary support chairs on the panel ledge below the windows, and on the header forms above the door and sliding glass door gaps;
27. Set insulation (e.g., an insulation board or other type of insulation) between the rebar on the temporary chairs below the windows and above the doors and sliding glass doors gaps;
28. Install horizontal rebar pieces through drilled holes in the insulation and secure to the horizontal rebar pieces on the inside and outside of the insulation, as applicable;
29. Remove temporary insulation support chairs, as applicable;
30. Install vertical rebar pieces, as required, on the inside and outside of the poured-in-place gaps above and below the windows, and above all the doors, and wire tie to all horizontal rebar pieces;
31. Install wythe anchor pins in grid pattern holes in insulation, as applicable;
32. Set and secure in place the inside and outside gap forms for all window and door gaps, and fasten to the wall by running bolts through the holes left by the plastic tubes along the sides of the form panels;
33. Install additional tie supports, as required, on poured-in-place gaps (e.g., window and doors) wider than 1 ft depending on finish sizes;
34. Pour concrete into the forms making sure to thoroughly vibrate the concrete to fill all the space and not leave any voids;
35. Allow concrete to cure before removing the forms;
36. Cut the rebar flush to the concrete (since it will not be used) where the windows, doors and sliding glass doors will be installed (i.e., where there would be no poured-in-place concrete);
37. Remove the temporary bracing;
38. Install and anchor steel components all around the perimeter of the top of the wall;
39. Rig and hoist steel roof trusses, and set into position;
40. Install temporary bracing, and weld the steel roof trusses to the anchor steel components;
41. After all roof trusses are installed, install steel roof purlins between the trusses;
42. Install cement decking prior to roofing installation;
43. Install vapor barrier prior to roofing installation; and
44. Install traditional standing seam metal roofing and trim.

Example 4—Method for Forming a Wall of a Building Using Pre-Stressed Insulated Concrete Panels The following method was also used to form a wall of a building structure (e.g., a single-family home) using a combination of (1) nine pre-stressed insulated concrete panels, such as the pre-stressed insulated concrete panels formed in Example 1, the nine pre-stressed insulated concrete panels having a variety of panel widths, and (2) poured-in-place panels to form a continuous wall. Although additional steps may be used, the steps used in the present examples were:

A. Clear the lot for the foundation. Since crane service is not needed, lot clearing can be minimized.

B. Excavate for foundation footers and slab. Footers for the foundation were somewhat larger than a normal timber-built house.

C. A monolithic pouring technique was used to pour the footers and the slab. A panel ledge slightly greater in width than wall panel thickness was incorporated into the footer.

D. Once the footer and the slab had cured, the pre-stressed insulated concrete forms were placed. Forms and racks for storing panels were positioned to easily accommodate pouring the forms and storing the panels after initial curing for final curing.

E. A string line was established at a given distance from the panel ledge. This step ensured that the wall was straight regardless of variations in the straightness or squareness of the footers/slab.

F. Calculation were made to determine where the window opening was to be. A panel was set on one side of the window opening assuring that the side (edge) of the panel, which faces the window, was plum. At this point a hole was drilled in the panel ledge so that a piece of angle could be installed using an expanding anchor bolt. Once the angle was secured to the panel ledge, it was welded to the adjacent angle, which was embedded in the bottom corner of the panel. Simultaneously, the panel was plumbed to the inside of the house. This was accomplished by attaching temporary bracing to the upper porting of the panel. Installing the angle and anchor bolt on the opposite edge of the panel completed the panel installation.

G. At this point the other side of the window opening was installed. Panel installation continued using the same methodology outline in step F. Care was taken to ensure that the edge of the panel facing the window opening was plum. This ensured that the window opening was the correct dimension and square. The window opening extended from the finish floor to the top of the wall allowing great flexibility for window sizing.

H. The balance of the panels on this wall were installed in a similar manner allowing approximately 12 inches between the panels. At this point, nine panels have been installed on the single wall with one window opening. There are two corner gaps of approximately 12 inches and the window opening. The following steps detail (1) turning a gap into an insulated column, (2) turning a gap into an insulated column with an electrical chase installed, and (3) addressing a gap within the footer and header above and below the window.

I. Installing a column, which is insulated, but has no electrical chase:

Each panel adjacent to what will become the column had form board holes approximately 2 inches from the column edge at appropriate intervals. This allowed the form boards to be bolted to the panel edge with no wall ties through the form boards (see, holes in FIG. 3A). Before bolting the form boards to the panel, the horizontal outside rebar was tied together. Once the outside rebar was tied together, an insulated chase was installed. The insulated chase was approximately 6 inches wide and 3 inches deep. It was wired to the horizontal rebar and stopped 16 inches from the bottom and 10 inches from the top. This allowed for 10 inches of solid concrete at the top and 16 inches at the bottom. Once the chase was wired in place the inside horizontal rebar was wired together. A minimum of two vertical rebars (e.g., four rebar) were then epoxied 3 inches deep in the panel ledge. Once the horizontal rebars were tied to the chase and the vertical rebars were epoxied in the panel ledge, the form boards were installed using the pre-engineered holes. Column was ready to be poured.

J. Installing a column, which is insulated, and has an electrical chase:

There are two major differences when an insulated chase is an electrical conduit. The first difference is, an electrical conduit will be fastened to the end of the chase for the first 14 inches at the top of the column, 10 inches in the wall, 4 inches above the wall. Depending on the wire size to be pulled through the chase ½", ¾" or 1-inch electrical conduit (conduit non-metallic) can be used. The second major difference is an electrical box will be attached to the form boards before they are bolted to the panel. The electrical box will be aligned so that it abuts to the bottom of the insulated chase. This will allow 16 inches of solid concrete at the bottom of the column. Form boards for the columns can either be wood or aluminum. In either case, placement of the electrical box on the form boards is accurately determined.

K. The headers over the windows used the same technique as the headers over the doors. The footer under the windows was similar to the headers, and resembled standard concrete form application. With the footers, rebar was needed to be tied and form boards installed. At the end of the forms, the form boards were attached through the pre-engineered holes. Depending on the size of the forms, additional wall ties might be required. Fiberglass wall ties were used to make sure no rust stains appeared. The same technique was used for the headers over windows and doors. In the case of headers, temporary support columns might be required. Fiberglass wall ties were used.

L. Once all the columns, footers under the windows, and headers over the doors and windows were poured, the concrete structure was complete. At this point, reinforcing steel was added at the top of the panels. For the majority of the panels, flat bar steel of the correct width and thickness was used. At the gable ends of the house, flat bar steel was replaced with the appropriate size steel channel. Other steel including steel beams might be required depending on the size and shape of the house. The steel reinforcement was attached to the top of the panels by drilling the correct size hole and installing expansion bolts through the steel, which was used to fasten the steel to the concrete. The structure (house) was now complete less the roof and any required interior walls. (The wall structure could stay in this state indefinitely.)

M. Installation of a fireproof roof utilized the following steps.

m.1. Installation of metal trusses.

m.2. Installation of metal purlins.

m.3. Installation of fireproof roof panels.

m.4. Installation of metal shingles or a standing seam roof.

m.5. Installation of gable ends including fireproof panels and metal shingles or metal panels.

N. To complete the project, interior walls, insulation for the roof, interior and exterior doors, windows, and finishing were installed.

In addition, it should be understood that although the above-described methods of making pre-stressed insulated concrete panels, pre-stressed insulated concrete panels, and methods of using pre-stressed insulated concrete panels are described as "comprising" one or more components or steps, the above-described methods of making pre-stressed insulated concrete panels, pre-stressed insulated concrete panels, and methods of using pre-stressed insulated concrete panels may "comprise," "consists of," or "consist essentially of" the above-described method steps and components of the methods of making pre-stressed insulated concrete panels, the pre-stressed insulated concrete panels, and the methods of using pre-stressed insulated concrete panels. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by," or any other variation thereof, are intended to encompass a non-exclusive inclusion, subject to any limitation explicitly indicated otherwise, of the recited components. For example, a method of making pre-stressed insulated concrete panels, a pre-stressed insulated concrete panel, and/or a method of using pre-stressed insulated concrete panels that "comprises" a list of elements (e.g., components or steps) is not necessarily limited to only those elements (or components or steps), but may include other elements (or components or steps) not expressly listed or inherent to the method of making the pre-stressed insulated concrete panel, the pre-stressed insulated concrete panel, and/or the method of using the pre-stressed insulated concrete panel.

As used herein, the transitional phrases "consists of" and "consisting of" exclude any element, step, or component not specified. For example, "consists of" or "consisting of" used in a claim would limit the claim to the components, materials or method steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a method of making a pre-stressed insulated concrete panel, a pre-stressed insulated concrete panel, and/or a method of using a pre-stressed insulated concrete panel that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described methods of making pre-stressed insulated concrete panels, pre-stressed insulated concrete panels, and/or methods of using pre-stressed insulated concrete panels may comprise, consist essentially of, or consist of any of the herein-described components, method steps, and/or features, as shown in the figures with or without any feature(s) not shown in the figures. In other words, in some embodiments, the methods of making pre-stressed insulated concrete panels, the pre-stressed insulated concrete panels, and/or the methods of using pre-stressed insulated concrete panels of the present invention do not have any additional features other than those shown in the figures, and such additional features, not shown in the figures, are specifically excluded from the methods of making pre-stressed insulated concrete panels, the pre-stressed insulated concrete panels, and/or the methods of using the pre-stressed insulated concrete panels. In other embodiments, the methods of making pre-stressed insulated concrete panels, the pre-stressed insulated concrete panels, and/or the methods of using the pre-stressed insulated concrete panels of the present invention do have one or more additional features that are not shown in the figures.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A method of making a pre-stressed insulated concrete panel, said method comprising:

forming the pre-stressed insulated concrete panel with a concrete panel thickness of the pre-stressed insulated concrete panel extending in a horizontal orientation, a concrete panel width of the pre-stressed insulated concrete panel extending in a vertical orientation, and a concrete panel length of the pre-stressed insulated concrete panel extending in a horizontal orientation, wherein said forming step comprises:

forming the pre-stressed insulated concrete panel on a base form, wherein said forming step comprises:

forming the pre-stressed insulated concrete panel on (i) the base form and between (ii) front and back side panels extending along the concrete panel width and the concrete panel length, and (ii) first and second form end panels extending along the concrete panel width and the concrete panel thickness, and wherein the base form comprises (a) one or more first base form holes within an upper surface of the base form, and said forming step comprises attaching the first and second form end panels to an upper surface of the base form via the one or more first base form holes, and (b) one or more second base form holes within an upper surface of the base form, and said forming step comprises attaching the front and back side panels to the base form via the one or more second base form holes.

2. The method of claim 1, wherein (A) each of the front and back side panels has (a) a side panel height (i.e., extending in a vertical direction) of from about 30 inches (in) to about 72 in, and (b) a side panel length (i.e., extending in a horizontal direction) of from about 8 ft to about 12 ft, and (B) each of the first and second form end panels (a) has an end panel height (i.e., extending in a vertical direction) of from about 30 in to about 72 in, and (b) an end panel width (i.e., extending in a horizontal direction) of from about 6 in to about 16 in.

3. The method of claim 1, wherein the base form has (a) a base form length of from about 10 feet (ft) to about 24 ft, and (b) a base form width of from about 12.0 in to about 24 in.

4. The method of claim 1, wherein said forming step further comprises:

positioning one or more embedded panel components within a form volume bound by (i) an upper surface of the base form, (ii) inner surfaces of the front and back side panels, and (iii) inner surfaces of the first and second form end panels, wherein the one or more embedded panel components comprise (i) an insulation board, (ii) vertical rebar pieces, (iii) horizontal rebar pieces, (iv) vertical rebar pieces and horizontal rebar pieces arranged in at least one layer of rebar, (v) at least one layer of fence material, (vi) from about 3 to about 8 chair supports, (vii) from about 6 to about 16 pieces of pipe material positioned thru holes along and proximate top and bottom edges of the front and back side panels, (viii) a plurality of wythe tie pins in a grid pattern through pre-drilled holes extending through the insulation board, (ix) a plurality of pre-stressing cables, or (x) any combination of (i) to (ix).

5. The method of claim 4, wherein the one or more embedded panel components comprise the insulation board sandwiched between two layers of rebar, and the two layers of rebar are sandwiched between two layers of fence material.

6. The method of claim 1, wherein said forming step further comprises:

positioning a plurality of cables so as to extend thru (a) a first pre-stressing cable anchor, a first end support beam, the first form end panel, the second form end panel, and out thru an opposite second end support beam;

applying tension on the plurality of cables;

pouring concrete into a form comprising (i) a base form (such as a beam, e.g., an I-beam), (ii) front and back side panels extending along a concrete panel width and a concrete panel length, and (iii) first and second form end panels extending along the concrete panel width and the concrete panel thickness.

7. A method of making a pre-stressed insulated concrete panel, said method comprising:

forming the pre-stressed insulated concrete panel with a concrete panel thickness of the pre-stressed insulated concrete panel extending in a horizontal orientation, a concrete panel width of the pre-stressed insulated concrete panel extending in a vertical orientation, and a concrete panel length of the pre-stressed insulated concrete panel extending in a horizontal orientation, wherein said forming step comprises:

forming the pre-stressed insulated concrete panel on a base form, wherein said forming step comprises:

forming the pre-stressed insulated concrete panel on (i) the base form and between (ii) front and back side panels extending along the concrete panel width and the concrete panel length, and (ii) first and second form end panels extending along the concrete panel width and the concrete panel thickness, and wherein said forming step comprises forming two pre-stressed insulated concrete panels along the base form during a single batch formation step, and said forming step comprises forming each of the two pre-stressed insulated concrete panels on (i) the base form and between (ii) two sets of front and back side panels extending along a concrete panel width $P_W$ and a concrete panel length $P_L$, and (ii) two sets of first and second form end panels extending along the concrete panel width $P_W$ and the concrete panel thickness $P_T$.

8. The method of claim 1, wherein the method takes place at a job site (e.g., a single-family home construction site).

9. A pre-stressed insulated concrete panel formed in the method of claim 1.

10. The pre-stressed insulated concrete panel of claim 9, wherein the pre-stressed insulated concrete panel comprises one or more embedded panel components, said one or more embedded panel components comprising one or more of: (i) an insulation board, (ii) vertical rebar pieces, (iii) horizontal rebar pieces, (iv) vertical rebar pieces and horizontal rebar pieces arranged in at least one layer of rebar, (v) at least one layer of fence material, (vi) from about 3 to about 8 chair supports, (vii) from about 6 to about 16 pieces of pipe material positioned thru holes along and proximate top and bottom edges of the front and back side panels, (viii) a plurality of wythe tie pins in a grid pattern through pre-drilled holes extending through the insulation board, (ix) a plurality of pre-stressing cables, or (x) any combination of (i) to (ix).

11. The pre-stressed insulated concrete panel of claim 10, wherein the one or more embedded panel components comprise (1) an insulation board, (2) vertical rebar pieces and horizontal rebar pieces arranged in at least one layer of rebar, and (3) at least one layer of fence material, wherein the insulation board is sandwiched between two layers of rebar, and the two layers of rebar are sandwiched between two layers of fence material, and the two layers of fence material are sandwiched between two layers of pre-stressing cables.

12. The pre-stressed insulated concrete panel of claim 10, wherein the pre-stressed insulated concrete panel comprises one or more surface features on one or more outer surfaces thereof, said surface features comprising one or more of (i) undulations and/or designs resulting from mirror undulations and/or designs along a form inner surface, (ii) one or more holes extending thru the pre-stressed insulated concrete panel proximate side edges of the pre-stressed insulated concrete panel, (iii) rebar pieces extending out from the outer surface of the pre-stressed insulated concrete panel, (iv) one or more corner L-angle members, or (v) any combination thereof.

13. The pre-stressed insulated concrete panel of claim 10, wherein the concrete panel width ranges from about 24 in to about 72 in, the concrete panel length ranges from about 72 in to about 130 in, and the concrete panel thickness ranges from about 5.0 in to about 14.0 in.

14. The pre-stressed insulated concrete panel of claim 13, wherein (a) the concrete panel width is about 36 in, the concrete panel length is about 116 in, and the concrete panel thickness is about 7.0 in, or (b) the concrete panel width is about 60 in, the concrete panel length is about 116 in, and the concrete panel thickness is about 7.0 in.

15. A method of using the pre-stressed insulated concrete panel of claim 10, said method comprising:

incorporating a plurality of the pre-stressed insulated concrete panels into a wall structure, wherein the wall structure comprises a continuous wall structure of a building structure, the continuous wall structure extending along an outer periphery of the building structure, and wherein the building structure comprises a residential building (e.g., an apartment structure, a single-family home, etc.), a garage, a barn, a shed, a utility building, an electrical/computer housing building, a commercial building, an industrial building, any other structure to be insulated, etc.

16. The method of claim 15, further comprising:

spacing the one or more pre-stressed insulated concrete panels apart from one another along a base surface of the building structure, wherein the one or more pre-stressed insulated concrete panels are spaced apart (i) by about 1.0 ft along wall portions that do not contain a window or door, or (ii) by about 3.0 ft to about 6.0 along wall portions that do contain a window or door;

positioning one or more wall embedded components between the spaced apart pre-stressed insulated concrete panels, the one or more wall embedded components comprising electrical wiring, electrical outlets, wall insulation component, wall rebar, plumbing, chases, fiber-optic cable, sound system or security wiring, heating and cooling components, or any combination thereof;

attaching pour-in-place forms to the spaced apart pre-stressed insulated concrete panels; and pouring concrete in gaps between the spaced apart pre-stressed insulated concrete panels and the pour-in-place forms to form the continuous wall structure.

17. A wall structure comprising (i) a plurality of spaced apart pre-stressed insulated concrete panels, wherein each of the pre-stressed insulated concrete panels comprises the pre-stressed insulated concrete panel of claim 10, and (ii) pour-in-place concrete columns between the spaced apart pre-stressed insulated concrete panels.

18. A building comprising the wall structure of claim 17, wherein the building is a residential building or a single-family home.

19. A pre-stressed insulated concrete panel formed in the method of claim 8.

20. A method of using the pre-stressed insulated concrete panel formed in the method of claim 8, said method comprising:

moving the pre-stressed insulated concrete panel from the base form on the job site to a wall location on the job site.

* * * * *